(12) United States Patent
Wietelmann

(10) Patent No.: US 9,496,552 B2
(45) Date of Patent: Nov. 15, 2016

(54) NITROGEN-CONTAINING HYDRIDE ANODES, AND GALVANIC ELEMENTS CONTAINING NITROGEN-CONTAINING HYDRIDE ANODES

(76) Inventor: Ulrich Wietelmann, Friedrichsdorf (DE)

( * ) Notice: Subject to any disclaimer, the term of this patent is extended or adjusted under 35 U.S.C. 154(b) by 1206 days.

(21) Appl. No.: 13/503,164

(22) PCT Filed: Oct. 26, 2010

(86) PCT No.: PCT/EP2010/066176
§ 371 (c)(1),
(2), (4) Date: Apr. 24, 2012

(87) PCT Pub. No.: WO2011/051290
PCT Pub. Date: May 5, 2011

(65) Prior Publication Data
US 2012/0214057 A1 Aug. 23, 2012

(30) Foreign Application Priority Data
Oct. 27, 2009 (DE) .................. 10 2009 046 047

(51) Int. Cl.
*H01M 4/02* (2006.01)
*H01M 4/58* (2010.01)
H01M 4/62 (2006.01)
H01M 10/052 (2010.01)

(52) U.S. Cl.
CPC ............... *H01M 4/58* (2013.01); *H01M 4/625* (2013.01); *H01M 10/052* (2013.01); *Y10T 29/49108* (2015.01)

(58) Field of Classification Search
CPC ....................................................... H01M 4/02
See application file for complete search history.

(56) References Cited

U.S. PATENT DOCUMENTS

| 4,888,258 A | 12/1989 | Desjardins et al. |
| 7,736,805 B2 | 6/2010 | Nazri et al. |
| 2009/0291368 A1* | 11/2009 | Newman et al. ............. 429/245 |

FOREIGN PATENT DOCUMENTS

EP    2 026 390 A2    2/2009

OTHER PUBLICATIONS

Gregory, Duncan H. "Lithium Nitrides as Sustainable Energy Materials", *The Chemical Record*, 8 (2008), pp. 229-239.
Chen, et al., "Interaction of hydrogen with metal nitrides and imides", *Letters to Nature*, 420, No. 21 (2002), pp. 302-304.

* cited by examiner

*Primary Examiner* — Jacob Marks
(74) *Attorney, Agent, or Firm* — Jeremy J. Kliebert

(57) ABSTRACT

The subject matter of the invention are transition-metal-free nitrogen-containing hydride anodes of the general formula $Li_oNH_{3-o}$, where o=1, 2 or 3, and wherein said transition-metal-free nitrogen-containing hydride anodes, in the charged state, are mixed with lithium hydride, and electrochemical elements, for example lithium batteries, which contain said transition-metal-free nitrogen-containing hydride anodes as the anode. The invention also describes methods for producing transition-metal-free nitrogen-containing hydride anode materials and electrochemical elements comprising transition-metal-free nitrogen-containing hydride anodes.

13 Claims, No Drawings

NITROGEN-CONTAINING HYDRIDE ANODES, AND GALVANIC ELEMENTS CONTAINING NITROGEN-CONTAINING HYDRIDE ANODES

This application is a §371 of PCT/EP2010/066176 file on Oct. 26, 2010, and claims priority from DE 10 2009 046 047.0 filed Oct. 27, 2009.

Currently used rechargeable lithium batteries contain graphite as anode material. Graphite functions as lithium insertion material, and according to the equation $$Li + 6C \rightarrow LiC_6$$

has a theoretical capacitance of 372 mAh/g at a potential of approximately 0.2 V relative to Li/Li$^+$. Use cannot be made of the significantly higher storage capacitance of lithium metal (3860 mAh/g) in batteries in practical application, since such batteries are not safe or cyclically stable. During cycling, the lithium metal sometimes separates not in planar form, but in the form of outgrowths (dendrites). These outgrowths may lose physical contact with the metal anode, causing the capacitance of the electrochemical cell to decrease. Even more serious are the consequences when needle-shaped dendrites penetrate the separator. The battery cell may thus be short-circuited, with often catastrophic effects: thermal run-away, usually accompanied by fire.

Therefore, efforts have been made to use metal lithium alloys instead of pure lithium as anode material. However, lithium alloys exhibit extreme fluctuations in volume during incorporation and withdrawal of the lithium (sometimes by several multiples of 100%, for example 238% for Li$_9$Al$_4$). For this reason, alloy anodes have not been commercially successful, with the exception of tin-graphite composites. However, tin is a rare and expensive element, which has prevented the widespread use of materials containing tin.

Tarascon and Aymard have proposed a battery in which lithium hydride is used as the negative electrode (anode) (EP 2026390 A2):

$$MFi_x + Li \Leftrightarrow xLiH + M \quad (1)$$

wherein M=La, Mg, Ni, Na, Ti.

However, the Mg-based system described in detail in the above-cited patent document has pronounced hysteresis, and heretofore its functionality has not been demonstrated in an actual lithium battery.

An anode material is sought which avoids the disadvantages of the prior art, which has
a high capacitance (>>372 mAh/g)
and at the same time has good cycle stability,
and does not contain expensive or toxic components.

It has surprisingly been found that galvanic elements, for example lithium batteries, containing a transition metal-free lithium-nitrogen compound of formula $$Li_oNH_{3-o}, \text{ where } o=1, 2, \text{ or } 3$$

in the negative electrode composition (anode) have good cycle stability. Compounds containing or composed of LiNH$_2$, Li$_2$NH, and Li$_3$N, and mixtures of at least one of the named compounds with lithium hydride (LiH) are suitable as a transition metal-free lithium-nitrogen compound. All of the named transition metal-free lithium-containing compounds are insoluble in common electrolytes that are aprotic (i.e., media which contain no acid hydrogen atoms), and may therefore be used in galvanic cells containing aprotic electrolytes, for example lithium batteries. Due to their low potential relative to Li/Li+, they may preferably be used as anodes (negative electrode). Suitable aprotic electrolytes may be solid, liquid, or gel-like. In particular liquid electrolytes composed of solutions of a lithium salt (for example, LiPF$_6$, LiBF$_4$, LiBF$_2$C$_2$O$_4$, LiB(C$_2$O$_4$)$_2$, lithium triflate, or lithium imides such as LiTFSI) in organic solvents (for example, carbonic acid esters, carboxylic acid esters, and/or nitriles) or ionic liquids are suitable.

The lithium charging and discharging process of the negative electrode (anode) may be described by the following equation:

$$LiNH_2 nLi \Leftrightarrow Li_{3-m}NH_m + n/2LiH \quad (2)$$

where
n=2 or 4;
m=0 for n=4, or m=1 for n=2.

The partial reactions are as follows:

$$LiNH_2 + 2Li \Leftrightarrow Li_2NH + LiH \quad (2a)$$

$$Li_2NH + LiH + 2Li \Leftrightarrow Li_3N + 2LiH \quad (2b)$$

and in sum:

$$LiNH_2 + 4Li \Leftrightarrow Li_3N + 2LiH \quad (2c)$$

There are various options for using transition metal-free lithium-nitrogen compounds (referred to below as nitrogen-containing hydride anodes) as the anode for galvanic elements. Thus, nitrogen-containing hydride anodes in the (partially) discharged state (Li$_o$NH$_{3-o}$, where o=1 or 2) may be connected to a lithiated insertion material, for example a lithium metal oxide Li$_x$M$^3$O$_y$. Accordingly, the electrode reactions are as follows:

$$Li_oNH_{3-o} + 4/oxLi_xM^3_yO_z \Leftrightarrow Li_3N + 3 - oLiH4/oxM^3_yO_z \quad (3)$$

wherein
M$^3$ is a redox-active metal selected from the group Co, Ni, Mn, Fe, V, Cr, Ti;
x is an integer between 1 and 3;
y and z are integers between 1 and 4; and
o is 1 or 2.

The following lithium metal oxides are particularly preferred: LiCoO$_2$, LiNiO$_2$, LiMn$_2$O$_4$, Li$_2$MnO$_3$, LiVO$_2$, and mixed metal oxides such as Li(Ni$_{1/3}$Mh$_{1/3}$Co$_{1/3}$)O$_2$, Li(Ni$_{0.85}$Co$_{0.15}$)O$_2$, Li(Ni$_{0.85}$Co$_{0.1}$Al$_{0.05}$)O$_2$, or LiFe$_{0.5}$Mn$_{1.5}$O$_4$.

Other lithium insertion materials such as lithium phosphates (LiFePO$_4$, LiVPO$_4$, LiMnPO$_4$, for example), lithium silicates (Li$_2$FeSiO$_4$, Li$_2$MnSiO$_4$, Li$_2$CoSiO$_4$, for example), and mixed lithiated fluorometal oxides may be used instead of a metal oxide.

It is also possible to connect the transition metal-free nitrogen-containing hydride anodes according to the invention in (partially) discharged form to lithium-free cathode materials. In this case, an additional lithium source must be incorporated. This lithium source is either pure lithium metal, for example in powdered form, or an alloy containing lithium metal. Pure lithium metal is preferably used, in which case a mixture of lithium hydride and lithium nitride forms in situ (during the first charging process):

$$Li_oNH_{3-o} + 4/oLi \rightarrow 2/oLiH + Li_3N \quad (4)$$

where o=1 or 2

Accordingly, the electrode redox reaction is as follows:

$$2/oLiH + Li_3N + 4/oM^3_yO_z \Leftrightarrow Li_oNH_{3-o} 4/oxLi_xM^3_yO_z \quad (5)$$

The theoretical gravimetric capacitance of LiNH$_2$ according to equation (2c) is 4673 Ah/kg, and is thus approximately 12.5 times that of graphite. Based on the mixture of Li$_3$N and 2 LiH that is effectively present, the theoretical capacitance of the hydride anode material according to the invention is 2114 Ah/kg.

The lithium in equation (4) may also be used in excess, in which case a mixture composed of lithium and lithium nitride forms in addition to lithium hydride:

$$Li_oNH_{3-o}+4/o+aLi \rightarrow 2/oLiH+Li_3N+aLi \quad (6)$$

wherein
a is a number between 0 and 5, preferably between 0 and 2.

Accordingly, the electrode redox reaction is as follows:

$$Li_oNH_{3-o}+aLi+4/oxLi_xM^3{}_yO_z \Leftrightarrow 2/oLiH+Li_3N+aLi+4/oM^3{}_yO_z \quad (7)$$

When the connection is made to a lithium-loaded insertion cathode, the transition metal-free nitrogen-containing hydride anode is preferably used in the discharged state, i.e., in the form of $LiNH_7$. When lithium manganese spinel, for example, is used as cathode, according to general equation (3) the galvanic cell has the following electrode configuration:

$$4LiMn_2O_4//LiNH_2$$

$$LiNH_2+4LiMn_2O_4 \Leftrightarrow 2LiH+Li_3N+4Mn_2O_4 \quad (3a)$$

According to the invention, it is also possible to connect the discharged transition metal-free nitrogen-containing hydride anode to a mixture of lithium metal and the partially or completely lithium-free lithium insertion cathode. Accordingly, the configuration is as follows:

$$4Li+4Mn_2O_4//LiNH_2$$

The lithiation of the cathode material may be carried out either ex situ (Le., outside the galvanic cell) or in the installed electrochemical cell during cyclization.

When a lithium-free (or low-lithium) insertion cathode is combined with a transition metal-free nitrogen-containing hydride anode according to the invention, the latter is preferably used in the charged state. For example, the transition metal-free nitrogen-containing hydride anode may be connected to a cathode composed of a suitable Braunstein's modification:

$$4MnO_2//2LiH+Li_3N$$

$$2LiH+Li_3N+4MnO_2 \Leftrightarrow LiNH_2+4LiMnO_2 \quad (5a)$$

Lastly, it is possible to connect a mixture of $LiNH_2$ and lithium metal to a lithium-free (or low-lithium) insertion cathode, for example $NiO_2$:

$$4NiO_2//LiNH_2+4Li$$

$$LiNH_2+4Li+4NiO_2 \Leftrightarrow 2LiH+Li_3N+4LiNiO_2 \quad (8)$$

The optimal (i.e., the theoretical) stoichiometric ratios are indicated in the above reaction equations and electrode configurations. However, it may be appropriate to deviate from these ratios, for example to increase the electrode stability.

For example, the theoretical molar ratio for the charged transition metal-free nitrogen-containing hydride anode according to the invention is $2LiH:1Li_3N$. If less LiH is used relative to $Li_3N$, for example only a molar ratio of 1:1, it is not possible to convert all the lithium nitride to the discharged form, the lithium amide ($LiNH_2$). Instead, a portion of the lithium nitride remains in unchanged form, even after the charging, or the partially discharged form $Li_2NH$ is formed. Accordingly, the electrode configuration and the charging-discharging equations are as follows, for example when a Braunstein's modification is used as cathode:

$$2MnO_2//LiH+Li_3N$$

$$LiH+Li_3N+2MnO_2 \Leftrightarrow \tfrac{1}{2}LiNH_2+\tfrac{1}{2}Li_3N+2LiMnO_2 \quad (5b)$$

$$LiH+Li_3N+2MnO_2 \Leftrightarrow Li_2NH+2LiMnO_2 \quad (5c)$$

The lithium nitride which does not participate in the redox process results in a lower change in volume of the anode during cyclization; i.e., the lithium nitride stabilizes the anode, thus further improving the cycle stability. Similarly, the partial discharging to form lithium imide also results in lower changes in volume.

If the nitrogen-containing hydride anode material according to the invention is used in the charged state, the molar ratio of LiH to $Li_3N$ may assume values between 0.5:1 and 10:1. Similarly, the molar ratio of $LiNH_2$ to Li may assume values between 1:1 and 1:20.

The transition metal-free nitrogen-containing hydride anode material according to the invention may be used in the completely discharged form (i.e., as $LiNH_2$), or also in a mixture with lithium nitride and/or LiH. Molar ratios of $LiNH_2$, $Li_3N$, and LiH according to the invention are generally in the range between 1:0:0 and 1:0.1-2:0.1-12.

The transition metal-free nitrogen-containing hydride anode material according to the invention is preferably present in powdered form. The particle size is generally <100 μm, particularly preferably <30 μm. Conductivity-enhancing additives, for example graphite, conductive carbon black, or finely divided metals (Ti powder, for example), are preferably admixed with the transition metal-free nitrogen-containing hydride anode materials according to the invention.

Within the meaning of the invention, it is possible to replace a portion of the lithium with another element of the first or second main group of the periodic table. For example, a mixture of lithium amide and magnesium amide may be used. Since the foreign metal lowers the storage capacitance, it should not be selected in a very high fraction. The lithium fraction relative to the total metal content of the transition metal-free nitrogen-containing hydride anode material according to the invention is preferably at least 80 mol-%, preferably at least 90 mol-%, and particularly preferably at least 95 mol-%.

The discharged transition metal-free nitrogen-containing hydride anode material is produced according to the prior art, for example by reacting lithium hydride with ammonia at temperatures above 300° C. according to $$LiH+NH_3 \rightarrow 4LiNH_2+H_2 \quad (9)$$

A particularly finely divided form is obtained by thermal decomposition of lithium bronze ($Li(NH_3)_4$):

$$Li(NH_3)_4 \rightarrow LiNH_2+3NH_3+\tfrac{1}{2}H_2 \quad (10)$$

This reaction is carried out particularly advantageously in an inert solvent (hydrocarbons, for example hexane, heptane, toluene) and in the presence of a hydrogen acceptor, for example a 1,3-diene such as isoprene:

$$Li(NH_3)_4+\tfrac{1}{2}C_5H_8 \rightarrow LiNH_2+3NH_3+\tfrac{1}{2}C_5H_{10} \quad (11)$$

The charged transition metal-free nitrogen-containing hydride anode material according to the invention is produced, for example, by mixing lithium hydride and lithium nitride. If the individual components do not have the desired particle size distribution, i.e., they are too coarse, for example, they may be ground, separately or particularly preferably in a mixture. This procedure is carried out, with the exclusion of air and moisture, under a hydrogen or inert gas atmosphere (nitrogen or noble gases), for example using a ball mill or rod mill. Conductivity enhancers such as graphite may be mixed in with the grinding stock.

Another particularly preferred method for preparing a lithium hydride/lithium nitride mixture is the reaction of $LiNH_2$ with lithium metal:

$$LiNH_2 + 4Li \rightarrow 2LiH + Li_3N \quad (12a)$$

$$LiNH_2 + 2Li \rightarrow LiH + Li_2NH \quad (12b)$$

Either lithium nitride or lithium imide is obtained, depending on the stoichiometry. Of course, a departure may also be made from the above theoretical ratios, and any desired molar ratio of $LiNH_2$ to Li may be selected. If, for example, a molar ratio of 1:3 is selected, a 1:1 mixture of lithium nitride and lithium imide is obtained. The molar ratio of $LiNH_2$ to Li is preferably 0.5:1 to 6:1. The precise stoichiometry must be taken into account in the construction of a galvanic cell; i.e., the electrode compositions must be balanced in a manner known to one skilled in the art in order to utilize the capacitances of both electrodes to the greatest extent possible.

The reactions according to (12a) and (12b) are preferably carried out either in a grinding process or thermally within the substance (i.e., in the absence of solvent), or in a dispersion in a high-boiling inert solvent (paraffin oil, for example) at temperatures above the melting point of lithium (180.5° C.). A mixture of elemental Li and lithium hydride in addition to lithium nitride is obtained when the lithium is used in excess.

The invention claimed is:

1. A galvanic element containing a transition metal-free nitrogen-containing hydride anode, a cathode containing a transition metal, and an aprotic lithium electrolyte, wherein the nitrogen-containing hydride anode in the discharged state contains lithium amide or further comprises lithium imide and the anode in the charged state contains lithium hydride, wherein transition metal-free nitrogen-containing hydride anode material may be used in the completely discharged form as $LiNH_2$, or in a mixture with lithium nitride and/or LiH, wherein the molar ratios of $LiNH_2$, $Li_3N$, and LiH are in the range between 1:0:0 and 1:0.1-2:0.1-12.

2. A galvanic element according to claim 1, wherein a partially or completely lithiated lithium insertion material is contained as cathode.

3. A galvanic element according to claim 1, wherein the lithium insertion material is selected from the group consisting of a lithium metal oxide, a lithiated phosphate, a lithiated silicate and a mixed lithiated fluorometal oxide.

4. A galvanic element containing a transition metal-free nitrogen-containing hydride anode, a cathode containing a transition metal, and an aprotic lithium electrolyte, wherein the nitrogen-containing hydride anode in the discharged state contains lithium amide.

5. A galvanic element containing a transition metal-free nitrogen-containing hydride anode, a cathode containing a transition metal, an aprotic lithium electrolyte, wherein the nitrogen-containing hydride anode in the discharged state contains lithium imide.

6. A galvanic element containing a transition metal-free nitrogen-containing hydride anode, a cathode containing a transition metal, an aprotic lithium electrolyte, wherein the anode in the charged state contains lithium hydride.

7. A galvanic element according to claim 1, further comprising a lithium insertion material is selected from the group consisting of a lithium metal oxide, a lithiated phosphate, a lithiated silicate and a mixed lithiated fluorometal oxide.

8. A galvanic element according to claim 1, further comprising a lithium insertion material selected from the group consisting of a lithiated phosphate, a lithiated silicate and a mixed lithiated fluorometal oxide.

9. A galvanic element according to claim 1, further comprising a lithium insertion material selected from the group consisting of a lithiated silicate and a mixed lithiated fluorometal oxide.

10. A galvanic element according to claim 9, wherein the lithium insertion material is a lithiated silicate.

11. A galvanic element according to claim 9, wherein the lithium insertion material is a mixed lithiated fluorometal oxide.

12. A galvanic element according to claim 8, wherein the lithium insertion, material is a lithiated phosphate.

13. A galvanic element according to claim 7, wherein the lithium insertion material is a lithium metal oxide.

* * * * *